United States Patent [19]

Köbler et al.

[11] Patent Number: 4,530,694

[45] Date of Patent: Jul. 23, 1985

[54] SHEET, OR SHEET PACKAGE TRANSPORT AND ROTATION APPARATUS, AND METHOD

[75] Inventors: Ingo Köbler, Anhausen; Godber Petersen, Augsburg, both of Fed. Rep. of Germany

[73] Assignee: M.A.N.-Roland Druckmaschinen Aktiengesellschaft, Offenbach am Main, Fed. Rep. of Germany

[21] Appl. No.: 523,198

[22] Filed: Aug. 15, 1983

[30] Foreign Application Priority Data

Aug. 19, 1982 [DE] Fed. Rep. of Germany ....... 3230846

[51] Int. Cl.[3] ....................... B65G 17/32; B65H 45/16

[52] U.S. Cl. ..................................... 493/425; 198/377

[58] Field of Search .................. 198/377, 627; 493/30, 493/425, 428, 429

[56] References Cited

U.S. PATENT DOCUMENTS

| | | | |
|---|---|---|---|
| 3,269,516 | 8/1966 | Kobler | 198/377 |
| 3,587,824 | 6/1971 | Rochla | 198/377 |
| 4,036,487 | 7/1977 | Heimlicher et al. | 493/428 |

FOREIGN PATENT DOCUMENTS

| | | |
|---|---|---|
| 830344 | 2/1952 | Fed. Rep. of Germany . |
| 919711 | 11/1954 | Fed. Rep. of Germany . |
| 1586347 | 11/1970 | Fed. Rep. of Germany . |
| 546197 | 2/1974 | Switzerland . |

*Primary Examiner*—Francis S. Husar
*Assistant Examiner*—Jorji M. Griffin
*Attorney, Agent, or Firm*—Frishauf, Holtz, Goodman & Woodward

[57] ABSTRACT

To re-orient the position of a sheet, or package of sheets (3), for example after having been folded in a folding former, cut, and transversely folded in a folding knife cylinder, a pair of vertically aligned dish-like plates, or disks (4,5) are moved in an endless transport path. The plurality of such pairs of plates or disks may be provided, each pair being moved in a path by a gear belt (16, 29) driven by a gear or sprocket wheel (20, 30). The plates or disks receive a sheet, or package of sheets (3) therebetween, then are moved towards each other to clamp the sheet therebetween, for example under cam control (25) and a spring (24), and, when the sheets are clamped, additional rotation is supplied to one (4) of the plates or disks, the other (5) being freely rotatable, for example by a stepping motor (37) coupled thereto via a gear transmission and a bushing or sleeve concentric with the shaft driving the sprocket wheel. Alternate pairs of plates or disks (4, 5; 4', 5'; 4'', 5'') are connected to individual stepping motors and gearing so that rapid handling of sheets, or sheet packages being delivered can be obtained. The system is particularly suitable for combination with multiple folding cylinders since multiple folds can be made by transporting the sheets at full supply speed.

11 Claims, 3 Drawing Figures

SHEET, OR SHEET PACKAGE TRANSPORT AND ROTATION APPARATUS, AND METHOD

Reference to related patent: German P 32 30 846.9

The present invention relates to apparatus for use in combination with printing machine systems, and more particularly to transport apparatus for sheets or packages of sheets between working stations in a printing machine system, in which the sheets, or packages of sheets, are transported on a transporting conveyor and, during transport, are to be rotated so that the leading edge of the sheet, or package, while being transported, is turned to become a side-edge. This, then, permits folding of the sheet, or packages of sheets, in selected folding patterns so that the folds or folding lines of such successive folds will be at right angles to each other. The system is particularly suitable for use with rotary printing machines, in which sheets, or a web, or a plurality of webs, which is later cut into a sheet or a plurality of sheets forming a sheet package is folded, for example in a folding former, or folding triangle.

BACKGROUND

Web-fed rotary printing machines frequently include a folding former, or folding triangle, in which the web is guided over a folding funnel or folding triangle after having passed the last printing station in order to generate a longitudinal fold. The web is then cut transversely toward the longitudinal direction. A first transverse fold can then be made across the severed sheets, or packages of sheets if a plurality of webs have been superimposed, for example by using a folding flap or blade cylinder. This first transverse fold becomes the second overall fold. A third fold, if required, can be generated by a folding blade. To make the third fold, it is necessary to slow the already folded sheets, and to properly orient the folded sheets. This causes problems in high-speed printing machines, and the deceleration, and slowing or braking of the sheets, or packages of sheets, limits the maximum speed with which the printing machine can operate. This speed may be below that of which the printing machine is capable.

It has previously been proposed, see German Pat. Nos. 830344 and 919711, to rotate sheet-like folded units by use of inclined transport elements, such as inclined transport belts or tapes and to thus obtain a change in direction of the product to be transported. Such change in direction, however, always involved braking, or reduction of transport speed. Rotation of the product in that manner, further, is not possible to achieve change of the orientation of the leading edge of the printed sheets or elements, as desired, and particularly change of orientation of the leading edge of the printing sheets by rotation about 90°.

THE INVENTION

It is an object to provide a transport arrangement for the transport of sheets, or packages of sheets, preferably of sheet units which already are folded and are to be, selectively, folded once more, in which the sheets can be rotated to a desired extent, for example by re-orientation of the leading edge by 90°, while the sheets move at full and maximum transport speed. Thus, a third fold, or, respectively, a second longitudinal fold, can be carried out and applied by a folding flap cylinder, as well known, and operating at rated maximum speed of the entire printing system.

Briefly, pairs of dish-like plates, or disks, are used, in which the sheets are fed between the individual disks or dish-like plates of the pairs which, after feeding of the sheet, are moved toward each other, and are then rotated to re-orient the leading edge of the sheet, or package of sheets, between the disks by a desired angle, for example 90°. The disks, or dish-like plates, while they carry out the turning movement to turn the sheets with them, are additionally moved forwardly in the transport path at the feeding speed of the sheets. When the sheets have been rotated by the desired amount, the disks or disk-like plates are again separated, for example under action of a cam, and the sheets are then fed to a removing conveyor for further processing, for example to a further sheet folding apparatus, such as a folding flap, or folding knife cylinder.

The degree of rotation, or re-orientation of any edge, for example the leading edge—which may be termed a reference edge—can be controlled by merely suitably controlling the angle of twist of the plates about an axis transverse to the major plane of the sheets, or package of sheets. If it is not desired to re-orient the sheets, it is simply unnecessary to impart the additional twist to the plates. This twist can be imparted, for example, by a suitable control apparatus, such as a stepping motor or the like, which can be activated or not.

In accordance with a preferred embodiment of the invention, an endless transport belt is provided, looped about two transport path guide rollers which guide the endless belt in the transport path of the sheet. The endless belt transports the sheet at rated machine speed. The sheets are gripped between sheet, or sheet package holders, for example the dish-like, or disk-like plates, which are engageable with the sheets, the holders being coupled to the endless belt being movable therewith. The sheet holders are additionally rotatable with respect to the transport path to rotate the sheets, or sheet packages in engagement therewith and thereby change the orientation of the reference edge.

The sheet holders, thus, must be capable of being subjected to the following movements:

(a) towards and away from each other, to clamp the sheets, or sheet packages between the disk or plates;

(b) rotatable about an axis transverse to the major surface of the disk or plates, to rotate the sheets or package of sheets and thus change the orientation of the reference, for example the leading edge; and (c) in the transport path, that is, to move while being coupled to the endless belts, the rotary movement and/or the movement towards and away from each other being simultaneous with the movement along the transport path.

The movement of the sheets towards and away from each other can readily be controlled by a cam; the rotary movement of the disks or plates can be controlled, for example by a stepping motor, or other rotary drive.

The system has the advantage that rotation of the sheets can be carried out in the plane of the sheets while they move at the same speed as the delivery speed from a printing machine, without slowing, or braking of the sheets or packages of sheets.

DRAWINGS

Figure 1:
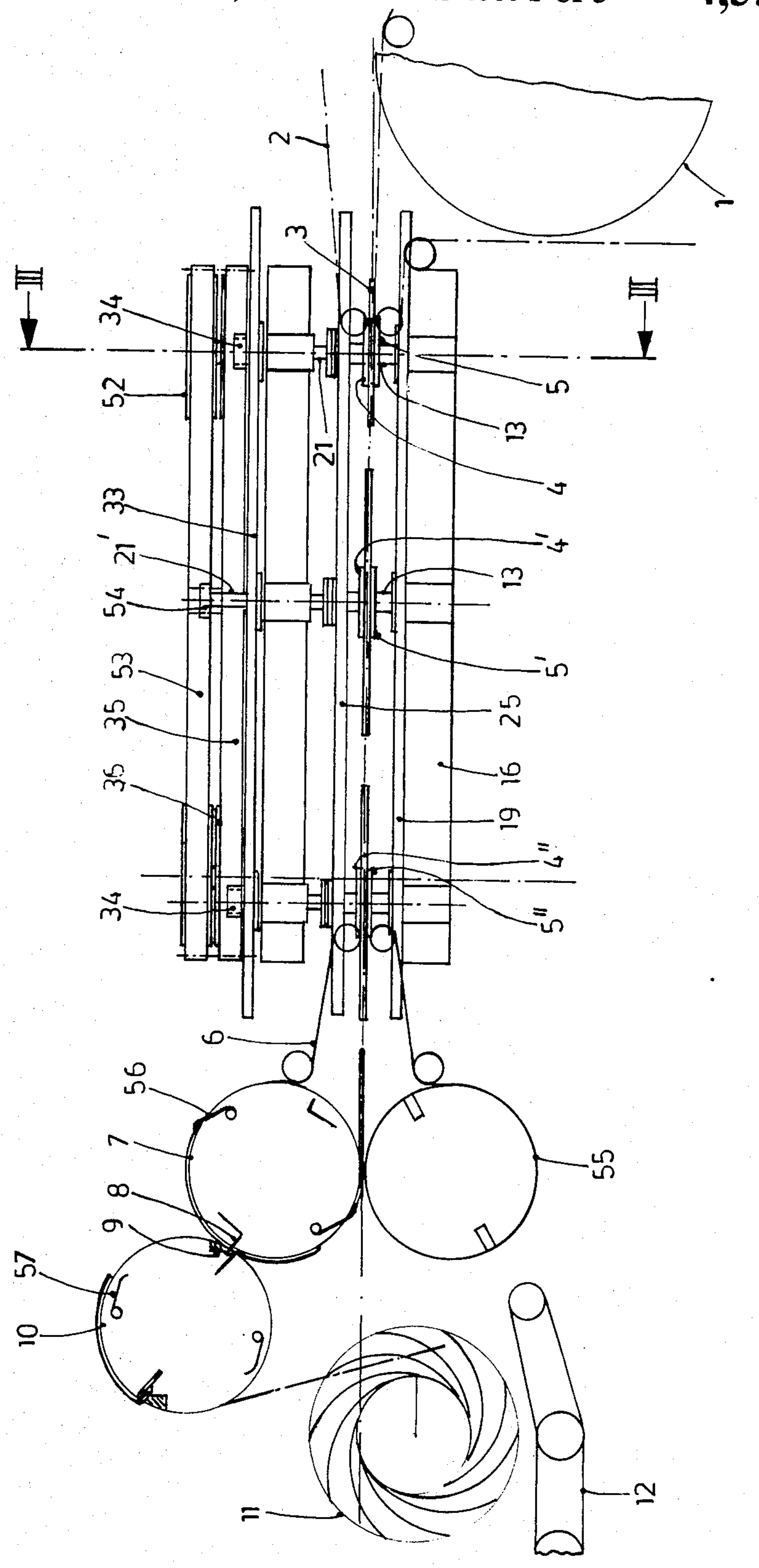
FIG. 1 is a side view of the overall apparatus.
Figure 2:
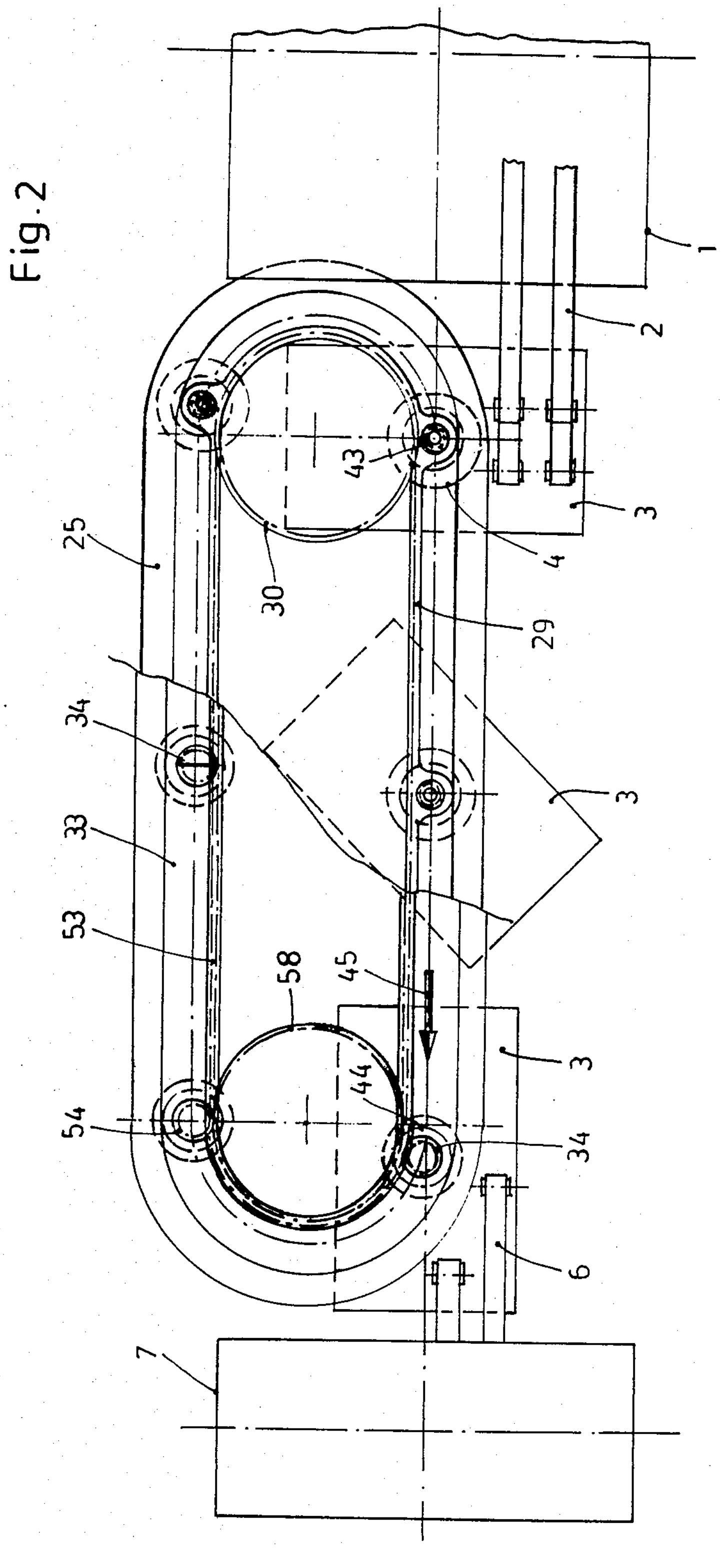
FIG. 2 is a top view omitting non-essential elements.
Figure 3:
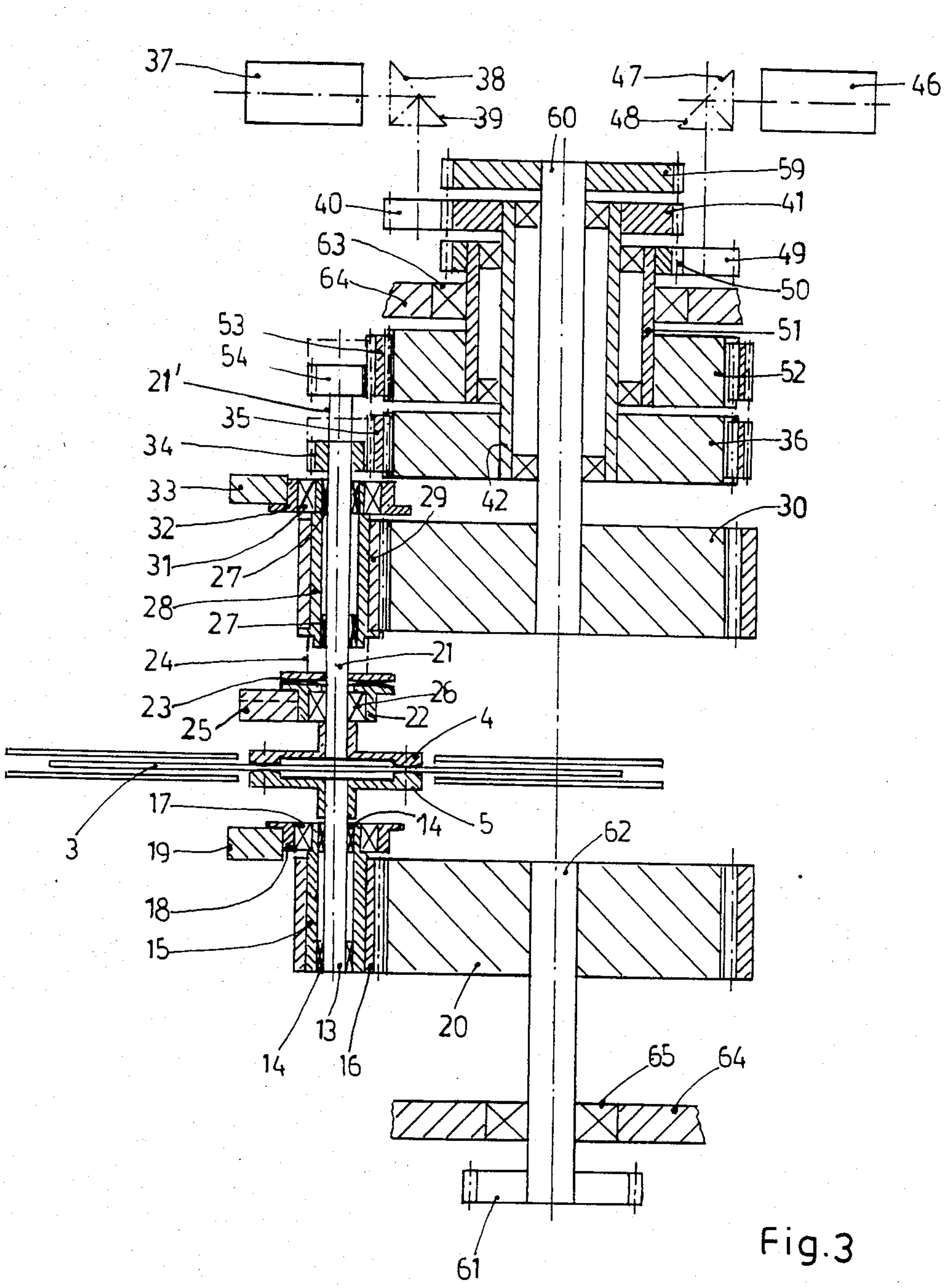
FIG. 3 is a section through line III—III of FIG. 1, showing conventional elements in schematic representation.

The system illustrated in FIGS. 1–3 is particularly suitable for combination with a rotary printing machine having a folding former associated therewith in which the folding former provides a longitudinal fold in a web, or a plurality of superimposed webs, to generate a longitudinal fold. The longitudinally folded sheets are then supplied to a folding flap, or folding blade cylinder 1 (FIG. 1) in which a first cross fold is generated, and which can be associated with a cutter system to cut the web into individual sheets, or packages of sheets. Conveyor belts or tapes 2 receive the folded sheets, or packages of sheets, hereinafter collectively, and for simplicity, folded units 3. The folded units 3 are received at full machine speed.

The units 3, being received, are fed between a pair of spaced dish-like disks or plates 4, or 5, in which the top disk 4 is visible in FIG. 2, the disks 4, 5, being best seen in FIG. 3. Disk 4 will be referred to as the upper dish; disk 5 will be referred to as the lower dish. The sheets, being supplied between the upper and lower dishes 4, 5, have a predetermined spacing from each other. When the units 3 are in the desired position between the dish 4, 5, the dishes 4, 5—as they move along a transport path shown by arrow 45 (FIG. 2)—are moved towards each other. A plurality of such pairs of dishes 4, 5 are secured to an endless transport belt—as will appear below; FIG. 1 illustrates three such pairs of dishes 4, 5; 4', 5' and 4'', 5''. More than three such units may be provided along a longitudinal transport path, FIG. 2 illustrating six such units 4, 5. As seen in FIG. 2, three such pairs are active in receiving, clamping, transporting, rotating, releasing, and delivering the units 3 at any time. The common transport belt operates in an oval path.

The packages 3 can be rotated by the dishes 4, 5 about any desired angle, and, specifically, about an angle which is precisely 90°, so that the leading edge of the units 3 will be changed, or its direction re-positioned. By rotating the units by 90° it is possible to then form a second longitudinal fold—or a third fold of all the folds—at full transport speed of the sheets. As best seen in FIG. 1, the unit 3 which is released by the pair of dishes 4'', 5'' can be transferred to a folding blade cylinder 10 by transport belts or tapes 6 which transfer the unit to a gripper cylinder 7. The gripper cylinder 7 has a folding blade cylinder 10, carrying folding blade 7 in operative association therewith. The folding blades 8 which are on the gripper cylinder 7 thus can generate a second longitudinal fold in the same manner on the sheets being transferred to the cylinder 10 as the first transverse fold formed in the units which are placed on the circumference of the folding blade cylinder 1.

The folding blade cylinder 10 delivers the sheets by any suitable or conventional delivery system to a delivery drum, or shoe-fly 11, from which the packages of sheets are removed by a further remover conveyor, for example conveyor belt 12.

The operation and guidance of the dish pairs 4, 5—and of any one of the other dish pairs—is best seen in FIG. 3. The lower dish 5 provides a counter or holding element for the upper dish 4. The lower dish 5 is securely connected to a shaft 13 which is easily rotable, but axially fixed, and retained within a ball-bearing pair 14. A bushing or sleeve 15 is retained on the outside races of the bearings 14. The bushing or sleeve 15 has its outer circumference secured to a gear belt 16, in which the gear teeth face to the right, with respect to FIG. 3, to mesh with a drive gear or sprocket wheel 20. A suitable connection is vulcanizing the bushing or sleeve 15 to, or in the belt 16. The belt 16 is moved with a speed which corresponds to the speed of the unit 3 being received from the folding blade cylinder 1 and to be supplied to the delivery belt system 6. A bearing 17, having its inner race in engagement with the outer surface of the bushing 15 has its outer race coupled to a flanged support roller 18 which is supported along a cam track 19, extending along the transport path. The belt 16 is looped about a drive sprocket, or drive gear 20, and is driven thereby at machine operating speed.

The upper dish 4 is securely connected to a shaft 21. A flanged support roller 22, rotatable about the shaft 21, but axially not shiftable, is pressed by a compression spring 24 via an axial bearing 23 against a cam track 25. The support roller 22 is seated in a bearing 126. The cam track 25, as indicated by a broken line across the section is so shaped that, as the upper dish 4 moves along the transport path, the upper dish 4 when receiving a unit 3 from the transport conveyor 2 will be in an upper position, lifted off the lower dish 5—see FIG. 2—so that a unit 3 can be fed between the separated dishes 4, 5. Thereafter, the upper dish 4 is lowered against the lower dish 5, to clamp the unit 3 therebetween. The unit 3, being securely clamped between the dishes 4, 5, is then moved along the transport path at machine speed by the belt 16 and a belt 29, as will appear. As the dishes 4, 5 reach the delivery position at the left of FIG. 2, that is, the position shown in FIG. 1 at 4'', 5'', the upper dish 4'' is raised by the raised portion of the cam track 25 to again release the unit 3.

The cam track 25, thus, effects timed up-and-down movement of the upper dishes 4, 4', 4'', as the respective dishes move, at feed transport speed, in synchronism, and opposite the respective dishes 5, 5', 5''.

The shaft 21 is readily rotatable by being retained within a ball-bearing pair 27—see FIG. 3. The shaft 21 is axially movably retained within a bushing, or sleeve 28, which is coupled to, for example by vulcanization, to an upper gear belt or sprocket belt 29. Upper sprocket belt 29 is in drive engagement with a drive gear 30, driven at machine transport speed. The bushing 28 is supported with respect to leaf spring 24 by a ball-bearing 31 and a support bushing 32. Support bushing 32 is guided along a guide track 33, which has the same function as the guide track 19 for the lower dish 5. A gear belt 34 is securely connected to shaft 21 and driven by a gear belt 35, which is looped about a sprocket or gear wheel 36. Sprocket or gear wheel 36 is rotated by a stepping motor drive 37, energized, for example, by a stepping motor which is coupled to bevel gears 38, 39, and/or face gears 40, 41, in which gear 41 is connected to a hollow shaft 42. Rotation of shaft 42 and hence of gear wheel 36, permits rotation of the shaft 21, and hence of the upper dish 4 and with it of the lower dish 5, when dishes 4 and 5 are clamped together with the unit 3 therebetween, by a predetermined twist angle as commanded by the motor 37 while the dishes 4, 5, are moved in the transport path. Consequently, unit 3, between the dishes 4, 5, will be rotated as the dishes rotate, thus re-orienting the leading edge, or a reference edge or line thereon.

FIGS. 1 and 2, when considered together, clearly show that the apparatus has six pairs of dishes, 4,5 . . . . Only the pairs 4, 5; 4'5'; 4'', 5'' are seen in FIG. 1; on the back side, three pairs of dishes moving in opposite direction will also be present, not specifically shown in FIG. 2, and not visible in FIG. 1. The six pairs of dishes are guided within the guide tracks 19, 33, and the cam 25. The transport path extends in a direction of the arrow 45, starting at a point 43 (FIG. 2) and extending to point 44. In that portion of the transport path, the direction is linear, i.e. along a straight line. Just before the pair 4, 5, has reached point 43, the cam track 25 controls separation of the dishes, 4, 5, from each other, for example, and as described above, by lifting the dish 4.

The stroke, or lift, caused by the cam track 25 is so arranged that the upper dish 4 will rapidly move downwardly in order to receive and clamp a unit 3 between the dishes 4, 5. The upper dish 4 is then pressed downwardly towards the lower dish 5 by the spring 24, so that the unit 3 which is to be both transported as well as rotated will be precisely and effectively clamped. Initially, the drive of the stepping motor 37 is so controlled that the upper dish 4 moves with the transport belt 29 at machine speed, without individual or superimposed rotary movement. After unit 3 has been gripped, the upper dish 4 will receive predetermined rotary pulses from the gearing system 37–39 until the rotation of the sheet is completed just before the point 44 has been reached, for example by rotating this unit by 90°. At that point, rotation will cease. At the instant when the unit 3, rotated by 90°, is gripped or received by the tape transport or conveyor system 6, the cam track 25 will cause the upper dish 4 to rapidly move upwardly so that the unit 3 is released for transport in the belt or conveyor system 5. The rapid upward movement causes the spring 24 (FIG. 3) to be compressed. The pair of dishes 4′, 5′, FIG. 2, is then returned back along the transport path after the unit 3 has been delivered to the tape or belt or conveyor system 6, by being moved in an overpath, to receive a further unit 3 when point 43 again is reached.

As clearly seen in FIG. 2, a plurality of pairs of dishes 4, 5; 4′, 5′; 4″, 5″ will be located between the points 43, 44 which, at the same time, must receive different rotary pulses. Consequently, succeeding pairs of dishes must have different drives to rotate the dishes if a plurality of dishes are present between the supply point 43 and the delivery point 44. In the example selected, three pairs of dishes can be driven by a belt 25; the remaining three pairs of dishes require a second drive.

A second drive, for example a second stepping motor 46, is provided—see FIG. 3—which is coupled over bevel gears 47, 48 and end gears 49, 50 to a sleeve 51 which drives a gear wheel 52 about which a gear belt 53 is looped, coupled to three pairs of dishes. The three gears which are to be rotated are in engagement with the gear belt 53. As seen in FIG. 3, the gear 54 is located on a shaft 21′ which is longer, that is, positioned above the upper dish 4′. FIG. 1, then, clearly shows that succeeding pairs of dishes are rotated by different drive elements. Thus, the stepping motor system 37 drives, via the gear 34, the shaft 21 of the upper dish 4 and 4″; the stepping motor system 46 drives the gear 54 and the shaft 21′ of the upper dish 4′, so that the respective gears 34, 54 are placed alternately along the transport path.

The system is versatile, and FIG. 1 illustrates another desirable and preferred extension thereof. A stapling cylinder 55 can be coupled to the system so that, simply, the second longitudinal fold, that is, the third complete fold of the sheets can be secured by stapling. Of course, a stapling cylinder similar to cylinder 55, for example forming part of an interchangeable, or removable stapling system, can also be used in connection with the first cross or transfer of fold. Additionally, it is possible to re-arrange the folds such that the second and third folds will be parallel, by merely disconnecting the stepping systems 37, 46, so that the dish pairs 4, 5 will not be rotated but merely transport the sheets. In that case, the belts 35, 54, will operate at sheet speed. This arrangement permits repetition of transverse fold, to make a second cross-fold. Stapling is also possible in this arrangement. If, in accordance with another operating mode the folding blade 8 is disabled, and instead grippers 56 are applied to the gripper cylinder 7, and grippers 57 to the folding blade cylinder 10, feed and supply of sheets with only a single cross fold can be carried out without requiring any change in the overall transport path. The sheets, after longitudinal folding in a folding former—not shown—and after severing are then gripped by the folding blade cylinder 1 and transversely folded; they are then transported, without rotation, from the grippers 56 of the gripper cylinder 7 and supplied to the grippers 57 of the folding blade cylinder 10 without introducing an additional fold thereto. The operating mode, the orientation and number of the fold line, thus can be easily controlled without changing the transport path, and without slowing overall machine operation.

The respective gear belts are guided by respective gear cylinders or wheels or sprocket wheels. Only the gear belt 29 and its guidance at the right side about the wheel 30 is shown in detail in FIG. 2 for simplicity of the drawing. The guidance at the left side is about a similar wheel 58. Only one of the two wheels 30, 58 need be driven. For example, wheel 30, which is coupled to a main drive wheel 59 which is secured and affixed to the main drive shaft 60, wheel 59 being coupled by suitable gearing, not shown, to the main drive of the machine. Similarly, the gear or sprocket wheel 20 for the lower gear belt 16 is coupled to the same main drive over a drive gear 61 seated on shaft 62.

As described, and for the six pairs of dishes 4, 5, two rotation units 37, 46 are used. In such an arrangement, the drive of three pairs of dishes is supplied over the bushing or sleeve 42 to the belt 35, sleeve 42 being rotatably journaled on the shaft 60 by suitable bearings. Three further pairs of dishes are driven over the bushing or sleeve 51 and the belt 53, the sleeve 51 being likewise concentric with the shaft 60, and rotatable therewith as well as rotatable with respect to the sleeve or bushing 42, see FIG. 3. The upper system can be fixedly secured on a frame 64 of the machine by means of a bearing 63. The frame 64 is shown only in fragmentary representation and may have any suitable shape to support the respective drive units. The lower system, likewise, can be retained in position over a frame member forming part of the frame 64 in which a bearing 65 is located, see lower portion of FIG. 3.

Various changes and modifications may be made within the scope of the inventive concept.

We claim:

1. Sheet or sheet package transport and rotation apparatus having means (1, 2) for supplying a sheet or sheet package (3);

means (6, 7) for removing the sheet, or sheet package, an endless belt means located between said supplying means and said removing means; and means located downstream of said supplying means, including a transport path (19, 33, 45) for changing the orientation of the leading edge of the sheet or sheet package as it is being received from a sheet supply means, moved within said transport path, and delivered to the sheet or sheet package removal means with changed orientation of a reference edge of the sheet or sheet package;

comprising two transport path guide rollers (20, 30, 58) guiding said endless belt means in said transport path;

a pair of superimposed endless gear belts looped about the transport path guide rollers;

a pair of superimposed aligned plates or disks (4, 5) movable:

(a) away and towards each other to clamp the sheet, or sheet package between the disks or plates;

(b) rotatably about an axis transverse to the major surface of the disks or plates (4, 5) to rotate the sheet or sheet package and thus change the orientation of the reference edge; and (c) conjointly with said endless gear belts (16, 29) in said transport path;

a cam means (23, 24, 25) extending lengthwise of said transport path coupled to at least one of said disks or plates and controlling movement toward and away from each other as the disks or plates move in said transport path;

the cam means controlling the respective position of the plates or disks with respect to each other for clamping and releasing the sheet or sheet package between the disks or plates;

an upper shaft (21) to which the upper one (4) of the plates or disks is secured;

and means for rotating the upper shaft (21) about a predetermined angle with respect to the transport path (45) to realign the reference edge of the sheet or sheet package, including a gear (34);

an endless gear belt (35) in engagement with said gear; and motor and rotation transmission means (37–42, 36) in engagement with said gear belt to rotate the gear belt and hence impart rotation to the shaft and hence to the upper plate or disk (4) as the upper plate or disk is being moved in said transport path.

2. Apparatus according to claim 1, wherein one (5) of the disks or plates is guided in said transport path at a predetermined level;

and said cam means (25) controls the other (4) of the disks or plates for lifting, or clamping movement with respect to said one disk or plate, the other disk or plate being veritically movable with respect to the endless transport belt means (29) moving said other disk or plate through the transport path.

3. Apparatus according to claim 1 wherein said motor and transmission means includes a stepping motor (37).

4. Apparatus according to claim 1 further including a drive gear (36) in engagement with the gear belt (35);

a main drive shaft (60) coupled to one (30) of said transport path guide rollers (20, 30, 58);

a sleeve or bushing (42) coaxial with and rotatable about said main drive shaft (60); and a gear train (38–41) forming part of said motor and gear drive coupled to the bushing or sleeve (42).

5. Apparatus according to claim 4 wherein the transport path guide rollers comprise gears or sprocket wheels (20, 30, 58), and the endless transport belt means comprise gear belts in engagement with the gearing or sprocket teeth of the gears or sprocket wheels.

6. Apparatus according to claim 4 further including an outer bushing, or sleeve (51) rotatably secured about and surrounding said bushing or sleeve (42);

a second motor and drive gearing (46–52) including a gear (52) located on the outer bushing or sleeve (51); and a drive gear (52) coupled to said gear on the outer sleeve or bushing (52);

wherein a plurality of said plates or disks are provided, and the shafts (21, 21′) extending from the upper plates or disks (4, 4′, 4″) of alternate sets of said aligned plates or disks are connected, alternatingly, to the gears (34,54) respectively in drive engagement with the motor and drive gearing (42–37) and the second motor and drive gearing (46–54), the second motor and drive gearing effecting rotation of the respective upper plate or disk (4′) during movement thereof in said transport path (45).

7. Apparatus according to claim 6, further including a machine frame (64);

and bearing means (63) secured to the machine frame and connected to the outer bushing or sleeve (51) and maintaining the outer bushing or sleeve (51), said bushing or sleeve (42) and the main drive shaft (60) in position in said frame.

8. Apparatus according to claim 4 further including a lower main drive shaft (52) coaxial with said drive shaft (60) and having a gear wheel (20) secured thereto in rotation transmitting manner, said gear wheel forming one of said transport path guide rollers, and wherein the endless transport belt means (16) is in engagement with said lower drive gear wheel (20) and includes a plurality of bushings or sleeves (16) secured thereto and retaining a shaft (13) to which the lower plate, or disk (5) is secured.

9. Apparatus according to claim 1 further including guide track means (19, 34) positioned and shaped to define, at least in part, said transport path, and guiding said upper and lower plates or disks (4, 5) in a curved, endless, path;

and flanged bushings (18, 32) rotatably coupled to said plates or disks (5, 4) and in engagement with said guide tracks to permit relative rotation of the plates or disks with respect to the flanged bushings while providing for guidance of the plates or disks in the path defined by said guide tracks.

10. Apparatus according to claim 9, wherein said guide track means positioned and shaped to define at least in part said transport path guide said upper and lower plates or disks in an endless oval path.

11. Apparatus according to claim 1, wherein the means (1, 2) for supplying the sheet or sheet package (3) and the means (6, 7) for removing the sheet or sheet package (3) include a folding knife cylinder, and the reference edge of said sheet or package of sheets is formed by a leading edge of the sheet or sheet package being received from the folding cylinder supplying the sheet or sheet package for rotation of the sheet or sheet package by 90° as the sheet or sheet package is moved is moved in said transport path and at the speed much to the speed of supply of the sheet or sheet package.

* * * * *